United States Patent
Peterson (10) Patent No.: US 7,490,392 B2
(45) Date of Patent: Feb. 17, 2009

(54) SEATING UNIT WITH FORMED CUSHION, AND MANUFACTURING METHOD

(75) Inventor: Gordon J. Peterson, Rockford, MI (US)

(73) Assignee: Steelcase Inc., Grand Rapids, MI (US)

( * ) Notice: Subject to any disclaimer, the term of this patent is extended or adjusted under 35 U.S.C. 154(b) by 189 days.

(21) Appl. No.: 11/296,679

(22) Filed: Dec. 7, 2005

(65) Prior Publication Data
US 2007/0126276 A1 Jun. 7, 2007

(51) Int. Cl.
*B68G 7/00* (2006.01)
*A47C 7/02* (2006.01)

(52) U.S. Cl. .......................... 29/91.1; 29/91.5; 29/446; 29/447; 29/450; 297/452.31; 297/452.58

(58) Field of Classification Search ............... 29/91.1, 29/91, 91.5, 91.7, 446, 447, 448, 450; 297/452.31, 297/452.32, 452.37, 452.48, 452.55, 452.58
See application file for complete search history.

(56) References Cited

U.S. PATENT DOCUMENTS

| | | | |
|---|---|---|---|
| 2,358,438 A * | 9/1944 | Beachley ........................ 5/402 |
| 3,101,218 A * | 8/1963 | Baermann .............. 297/452.65 |
| 3,122,829 A * | 3/1964 | Schaad et al. ................. 29/436 |
| 3,139,307 A * | 6/1964 | Hawley et al. ......... 297/452.65 |
| 3,288,529 A | 11/1966 | Koch |
| 3,314,721 A * | 4/1967 | Smith .................... 297/451.12 |
| 3,439,397 A * | 4/1969 | Marshak ........................ 29/91 |
| 3,983,614 A * | 10/1976 | Koepke et al. ................ 29/91.1 |
| 4,544,205 A | 10/1985 | Molnar |
| 4,556,254 A | 12/1985 | Roberts |
| 4,561,695 A | 12/1985 | MacCready |
| 4,718,153 A | 1/1988 | Armitage et al. |
| 4,946,220 A | 8/1990 | Wyon et al. |
| 5,169,580 A | 12/1992 | Marcus |
| 5,294,392 A | 3/1994 | Marcus |
| 5,366,678 A * | 11/1994 | Nomizo et al. .............. 264/122 |
| 5,482,665 A * | 1/1996 | Gill ............................. 264/113 |
| 5,492,662 A | 2/1996 | Kargol et al. |

(Continued)

FOREIGN PATENT DOCUMENTS

EP 550954 A1 * 7/1993

(Continued)

*Primary Examiner*—Essama Omgba
(74) *Attorney, Agent, or Firm*—Price, Heneveld, Cooper, DeWitt & Litton LLP (57) ABSTRACT

A cushion subassembly includes a support, a cushion of nonwoven polymeric (PET) or PETE fibers with a formed edge that wraps over an edge of the support, and an upholstery sock pulled onto and covering the support and the cushion. The formed edge has sufficient structure to retain the cushion in place on the support as the upholstery sock is pulled onto the support. A back support shell supports the cushion assembly, and has first fasteners that engage in a first direction and second fasteners that prevent disengagement. The cushion assembly is stressed during assembly, especially at corners, but is thermally stress-relieved after assembly to relax the polymeric fibers and the upholstery sock to a state of minimized balanced tension. The back support shell includes a shallow depression on its face. The cushion fills the depression sufficient to eliminate loose fabric but provides a same force deflection curve across its shape.

6 Claims, 7 Drawing Sheets

U.S. PATENT DOCUMENTS

| | | |
|---|---|---|
| 5,494,627 A | 2/1996 | Kargol et al. |
| 5,569,425 A * | 10/1996 | Gill et al. ............ 264/121 |
| 5,571,465 A * | 11/1996 | Gill et al. ............ 264/121 |
| 5,679,197 A | 10/1997 | Haupt et al. |
| 5,743,982 A * | 4/1998 | Marfilius et al. ......... 156/212 |
| 5,935,364 A * | 8/1999 | Groendal et al. ......... 156/216 |
| 5,957,534 A | 9/1999 | Wilkerson et al. |
| 6,003,950 A | 12/1999 | Larsson |
| 6,109,688 A | 8/2000 | Wurz et al. |
| 6,135,562 A | 10/2000 | Infanti |
| 6,220,661 B1 * | 4/2001 | Peterson ............ 297/218.4 |
| 6,221,292 B1 * | 4/2001 | Carroll, III ............ 264/122 |
| 6,394,546 B1 * | 5/2002 | Knoblock et al. ....... 297/284.7 |
| 6,425,637 B1 | 7/2002 | Peterson |
| 6,499,801 B1 * | 12/2002 | Peterson et al. ....... 297/228.13 |
| 6,726,278 B1 | 4/2004 | Albright et al. |
| 7,111,373 B2 * | 9/2006 | Shimano et al. .......... 29/91.5 |
| 2003/0026970 A1 | 2/2003 | Hernandez et al. |
| 2005/0023879 A1 | 2/2005 | Drajan |
| 2007/0137014 A1 * | 6/2007 | Montgomery ............ 29/91 |

FOREIGN PATENT DOCUMENTS

| | | | |
|---|---|---|---|
| JP | 02200296 A | * | 8/1990 |
| JP | 06015070 A | * | 1/1994 |
| JP | 06269581 A | * | 9/1994 |

* cited by examiner

SEATING UNIT WITH FORMED CUSHION, AND MANUFACTURING METHOD

BACKGROUND

The present invention relates to seating units, and more particularly relates to a chair having a formed cushion, where the cushion is shaped to mate with a stiffener in a manner adapted to facilitate subassembly into an upholstery sock, and also shaped to optimize comfort and appearance in the final seating product. Further, the present invention concerns methods of assembly related to the above.

Many chairs include a back structure covered by an upholstery subassembly, where the upholstery subassembly forms a sock-like hollow covering that can be pulled onto the back structure to aesthetically cover all or part of the back structure. For example, see U.S. Pat. No. 6,425,637 Peterson. A common problem in many such chair designs is that the sock must be tight enough to eliminate unattractive wrinkles and to eliminate loose fabric sections on the upholstery, but must not be so tight as to prevent the sock from being slipped onto the back structure or to cause distortions to its cushion during assembly. Quality problems often occur during assembly due to normal manufacturing variations in stitching and variations in part dimensions and material properties such as elasticity, compressibility, and tensile strength. Also, traditional polyurethane foam cushion material tends to frictionally drag on the sock (or grip the back structure if it is part of the upholstery subassembly) during assembly. Each of these conditions can result in distortions and non-uniformities in the cushion and/or in the upholstery after assembly (e.g., wrinkles, distortions, puckers, loose fabric sections, irregular corners, etc.). It is often difficult to know whether the distortions and non-uniformities are caused by conditions prior to, during, or after assembly . . . or a combination thereof. The problems tend to be especially evident at corners and feature lines of the back where dimensional variations in mating components and stitch lines are easily seen. Depending on the chair design, distortions and non-uniformities can be very unsatisfactory to consumers (particularly in higher end chairs), since such distortions and non-uniformities are interpreted as low quality. Thus, an improvement is desired that facilitates construction of an upholstery subassembly, and that facilitates assembly of the upholstery subassembly to a back structure. Further, an improvement is desired that helps eliminate or at least control distortions and non-uniformities. It is believed that part of a solution to the present problems is connected to managing and distributing the tension and stress between the cushion and the upholstery sock, particularly at highly visible corners.

Loose unsupported sections of upholstery are particularly difficult to control in large flat or recessed areas where the upholstery is poorly supported or totally unsupported. For example, if the upholstery is not properly and uniformly tensioned in all directions, the material hangs loose and sags. But if the upholstery is unevenly tensioned, the material forms undulating ridges and stretch-related channels that extend parallel a direction of the "over-tension". If the upholstery is simply too highly tensioned, the cushion may become locally distorted via uneven compression of the cushion, thus also causing visual defects. These conditions are especially problematic in large relatively-flat areas, such as along a front middle area of a chair back (i.e., a lumbar region) or on a center of a relatively flat-topped chair seat. Also, these conditions will occur when a concave face of a back support shell (i.e., a shallow depression surrounded by a ring of marginal material higher than a bottom of the shallow depression), since tension on the upholstery material will cause the upholstery material to bridge across the bottom at a location spaced above the bottom, . . . instead of pulling the upholstery against the bottom of the shallow depression. Typically, these problems may worsen over time and with use of the chair as the fabric stretches and as the cushion takes on a compression set.

It is noted that Peterson U.S. Pat. No. 6,425,637 discloses a chair construction of interest, including a PETE or PET cushion of non-woven fibers (see FIGS. 3-6 and 14), an upholstery sock-like structure of interest (see FIGS. 3-7 and column 6, lines 15+) and related assembly method (see FIGS. 3-7 and 13). However, improvement is desired so that the cushion holds itself on the cushion stiffener during assembly of the upholstery sock onto the cushion and cushion stiffener and to eliminate wrinkles and unevenly stretched areas after the assembly. Also, improvement is desired to better secure the cushion stiffener onto the back support shell.

Sometimes attempts are made to control the upholstery by adhering the upholstery to the cushion under the problem area. However, adhesives are expensive to purchase, and to apply . . . and further are not always a solution to the appearance problem. Further, adhesives can affect compression of the cushion and adversely affect user comfort. Still further, over time the cushion and upholstery may stretch and give, resulting in loose unsupported sections of upholstery.

One attractive style for chairs comprises a layered look where the upholstery subassembly (including a cushion) is attached only to a face of a support structure on a chair back or seat. In such chair designs, it is important to maintain proper centered placement of the upholstery subassembly on the support structure (i.e., to prevent the cushion and/or upholstery from creeping or "walking" toward one side or another of the support structure) to avoid warranty and appearance problems after significant use of the chair. Further, it is important that the attachment of the upholstery subassembly to the support structure be both secure, relatively thin, and preferably hidden, so that the style can be maintained without forcing the chair to have a thick heavy appearance, and without forcing the chair to include multiple visible screw heads or containment structure. Further, it is desirable to provide an attachment system that eliminates screws and time-consuming assembly steps, and that can be formed integrally with the underlying mating components.

Thus, a system having the aforementioned advantages and solving the aforementioned problems is desired.

SUMMARY OF THE PRESENT INVENTION

In one aspect of the present invention, an upholstered component includes a support having edge portions, a pad of formable polymeric fibers with at least one formed edge that wraps over at least one of the edge portions of the support, and an upholstery cover shaped to at least partially cover the support and the pad. The formed edge is sufficiently preformed and structural to retain the cushion in place on the support as the upholstery cover is positioned on the support and pad and as the upholstery cover is extended over the formed edge and the one edge portion.

In another aspect of the present invention, a seating unit includes a back support with a face surface having a first pattern of fasteners, and a cushion assembly engaging the face surface and including a second pattern of fasteners. The first and second pattern of fasteners are configured to matingly engage when the cushion assembly is moved in a first direction parallel the face surface during assembly of the cushion assembly onto the back support, and are configured to resiliently interlock in a self-retained position when the cushion assembly reaches a fully-assembled position on the back support.

In yet another aspect of the present invention, a method for stress-relieving upholstery comprises steps of providing a furniture unit including a support having corners, and providing a pad of formable polymeric fibers and having formed edges. The method further includes positioning the pad on a front of the support but with the formed edges extending to rearward of the corners of the support, providing an upholstery cover shaped to cover the support and the cushion including the corners, and positioning the upholstery cover on the support and the cushion to cover the support and the cushion. The method still further includes stress-relieving at least the corners of the cushion and the upholstery cover to reduce distortions and objectionable wrinkles in the upholstery cover at the corners by applying hot gases to cause the polymeric fibers and also the upholstery cover to relax to a state of minimized balanced tension In another aspect of the present invention, a method of constructing a seating unit comprising steps of providing a support panel with a concave front surface, and providing a cushion of non-woven polymeric fibers engaging the front surface, the cushion being formed to have a shape with a rear surface matching the front surface. The method further includes assembling an upholstery sheet onto the support panel and the cushion, the upholstery sheet being tensioned, and thermally treating the assembly of the support panel, the cushion and the upholstery sheet to cause the cushion to take on a relaxed state that both fills the concave recess and that also stress-relieves the cushion and upholstery to cause a state of minimized tension.

In still another aspect of the present invention, a method of upholstering a support member with edges, comprising steps of providing a cushion of formable polymeric fibers with at least one formed edge, wrapping the at least one edge of the cushion around an edge of the support member, and setting the formed edge of the cushion in the wrapped condition.

In yet another aspect of the present invention, a method of assembly comprising steps of providing a blank of formable polymeric fibers capable of forming a cushion, forming edges of the blank to define a recess, and placing a support member into the recess to form a pre-assembly.

In another aspect of the present invention, a method of assembly comprises steps of providing a blank of formable polymeric fibers, the blank including a perimeter, placing a support member against the blank with at least one edge of the support member extending generally along but inboard of an associated part of the blank's perimeter, and forming the associated part of the blank onto a rear of the one edge of the support member, with the formed associated part mechanically retaining the blank in place on the support member.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
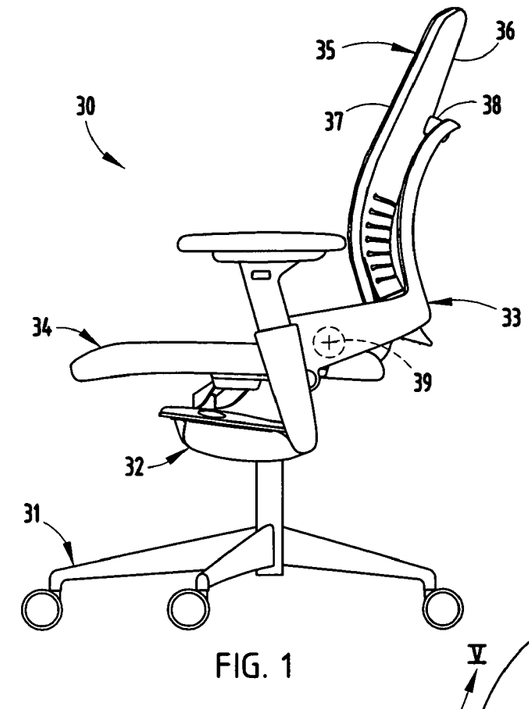
FIG. 1 is a rear perspective view of a chair embodying the present invention.

A seating unit 30 (FIG. 1) includes a base 31, an underseat control 32, a back frame 33 operably supported in the base 31, and a seat 34 operably supported at its front on the base 31 and at its rear on the back frame 33 for synchronous movement of the seat 34 upon recline of the back frame 33. A back assembly 35 is supported on the back frame 33, and includes a back support 36 (also sometimes called a back "shell" or "support panel") and a cushion subassembly 37 on the back support 36. The back support 36 is operably supported on the back frame 33 at top and bottom pivots 38 and 39 (FIGS. 1-2) and is flexible in its lumbar region and forwardly biased, such that it provides a seated user with exceptional comfort and ergonomic support, especially to the user's lower back. The reader is referred to Knoblock U.S. Pat. No. 5,975,634 and Peterson U.S. Pat. No. 6,425,637 if additional information is desired about the interaction and cooperation of these types of components in supporting a seated user. The entire contents of Knoblock U.S. Pat. No. 5,975,634 and also Peterson U.S. Pat. No. 6,425,637 are incorporated herein in their entirety for the purpose of providing an enabling disclosure.

Figure 4:
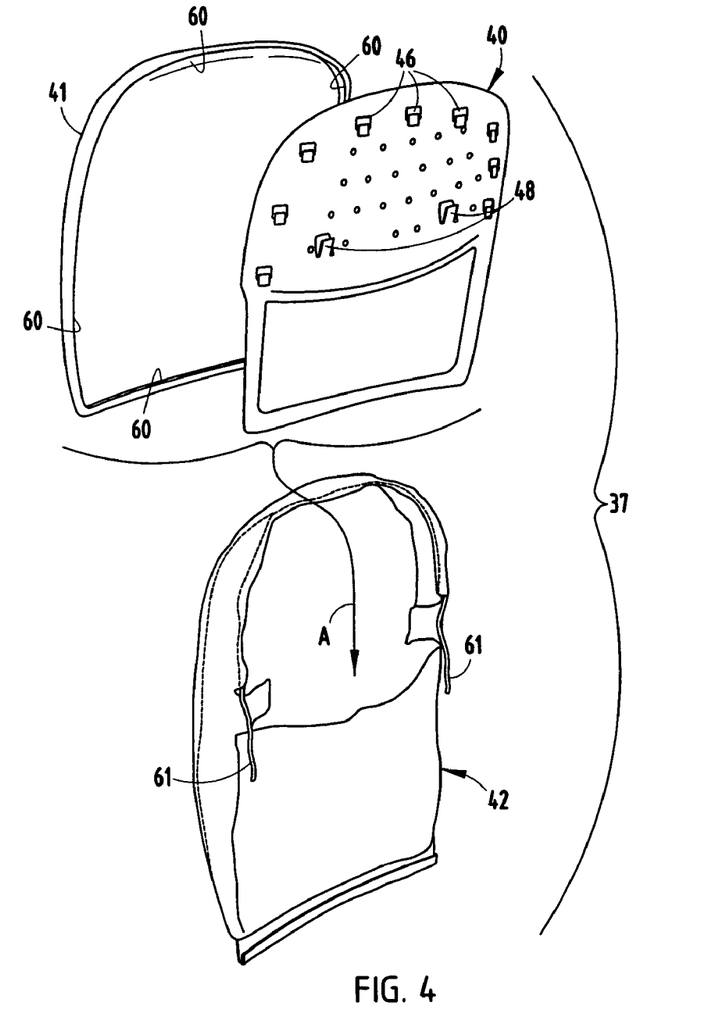
Figure 13:
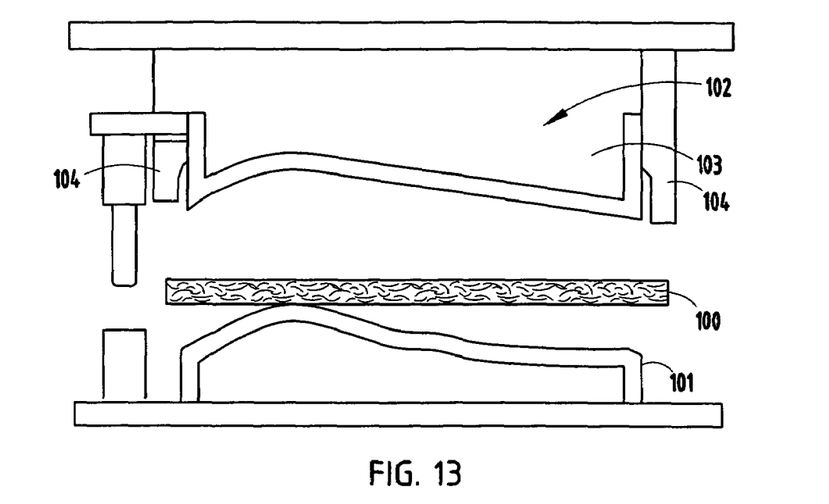
FIGS. 13-19 are schematic side views showing the forming tools and process of forming the edges of the non-woven fibrous cushion.
Figure 14:
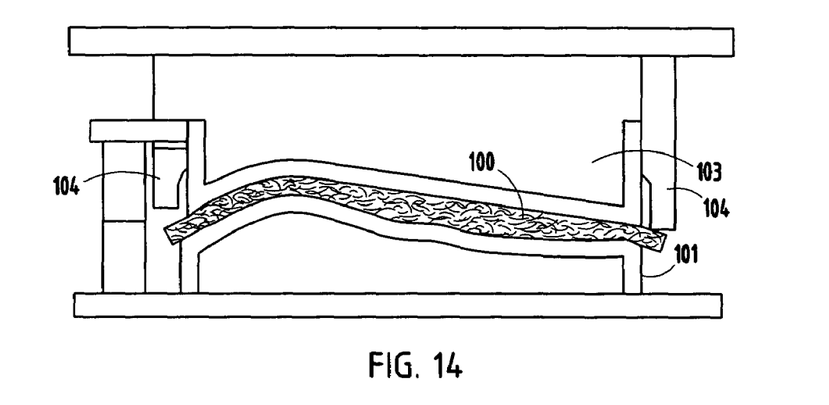
Figure 15:
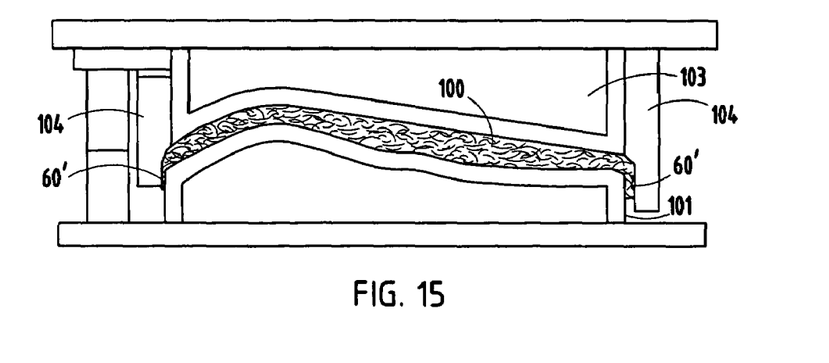
Figure 16:
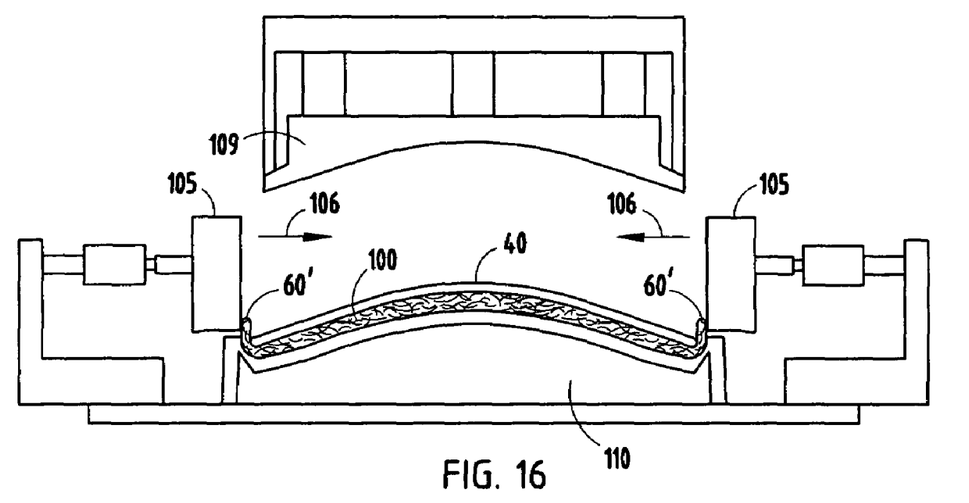
Figure 17:
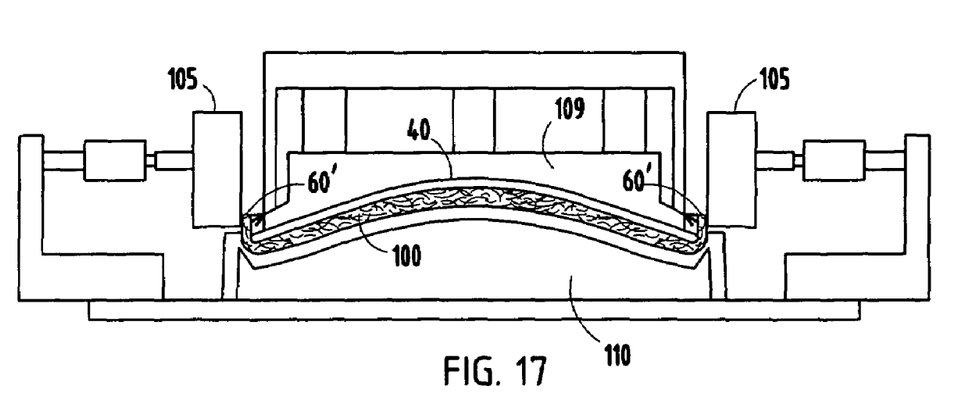
Figure 18:
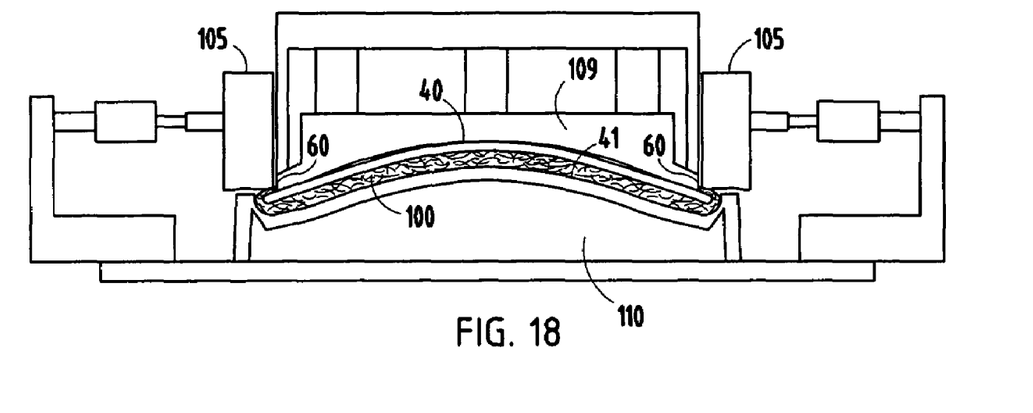
Figure 19:
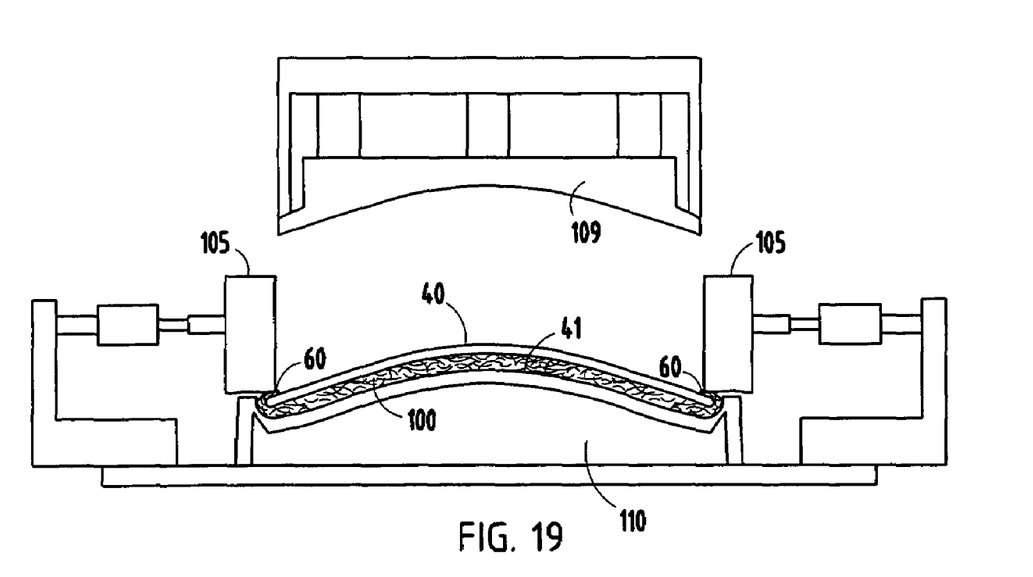

The cushion assembly 37 (FIG. 4) includes a cushion support 40 (also referred to as a "cushion stiffener"), a cushion 41 of non-woven polymeric PETE fiber, and an upholstery sock 42 (also called an upholstery assembly). Notably, PET fiber can also be used, but PETE fiber is preferable. The cushion 41 is made by cutting a blank 100 (FIG. 13) from a raw sheet of non-woven PETE fibrous material of uniform thickness and density. As described below in regard to FIGS. 9-11 and 13-19, the blank 100 is pre-formed to have formed edges 60 shaped to wrap over edges of the cushion support 40. By this arrangement, as the upholstery sock 42 is pulled onto the cushion support 40 and the cushion 41 in direction "A", the cushion 41 does not roll or slide out of position. In other words, the formed edge 60 has sufficient structure to retain the cushion 41 in place on the cushion support 40 as the upholstery sock 42 is pulled onto the support. Advantageously, this eliminates the need for the cushion 41 to be adhered or attached to the cushion support 40 during assembly of the upholstery sock 42 onto the cushion 41 and support 40, thus eliminating cost and a step during manufacturing. It is noted that in the preferred illustrated arrangement, as described below, a drawstring 61 is still used to secure a top of the upholstery sock 42. However, it is contemplated that the present invention is useful in chair designs where only a portion of the entire perimeter of the cushion is made to include a formed edge 60 for temporarily retaining the cushion onto a cushion support until attachment of a covering.

Figure 2:
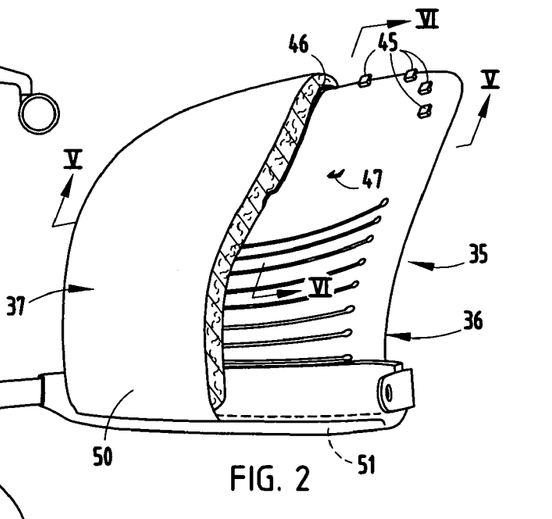
FIG. 2 is an exploded perspective view of an upholstery cushion assembly.
Figure 3:
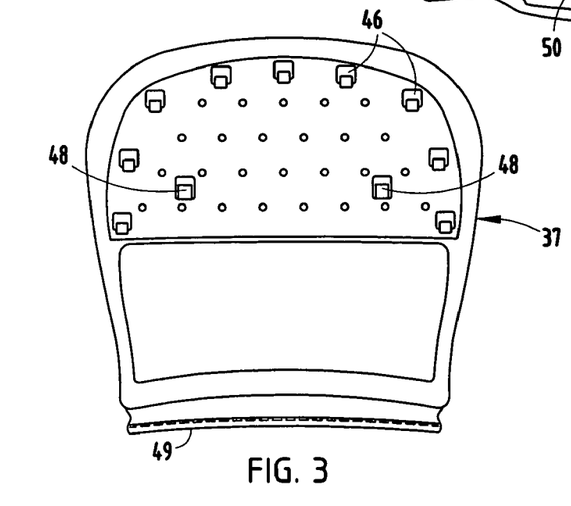
FIGS. 3-4 are rear and perspective views of FIG. 2, with FIG. 4 being partially broken away to show otherwise hidden structure.
Figure 12:
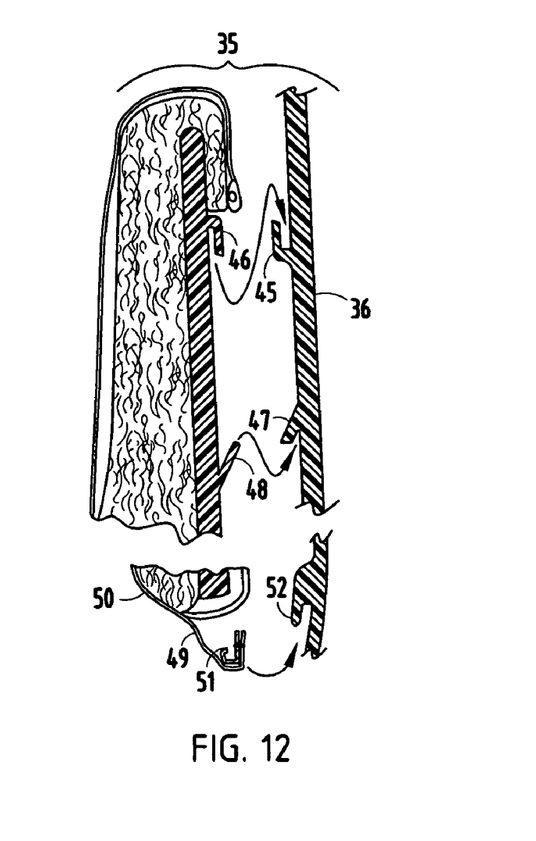
FIG. 12 is an exploded cross section showing assembly of the cushion subassembly (including the cushion, cushion stiffener, and upholstery sock) onto a back support to form the back assembly of the chair shown in FIG. 1.

The illustrated back support 36 (FIGS. 2 and 12) is adapted to support the cushion assembly 37 as shown in FIGS. 2 and 12. The back support 36 has hook-shaped first fasteners 45 that engage mating strap-like fasteners 46 on the cushion (stiffener) support 40 in a first (downward) direction, and further includes wedge-shaped second fasteners 47 that engage mating resilient finger-like fasteners 48 on the cushion (stiffener) support 40 to prevent disengagement of the first fasteners 45/46. The resilient fasteners 48 comprise angled flexible fingers that allow the wedge-shaped second fasteners 47 to ramp downwardly and over the resilient fasteners 48, after which the resilient fasteners 48 snap into place to securely hold the thoracic upper part of the cushion stiffener support 40 downwardly and closely against the back support 36. It is contemplated that the resilient fasteners 48 could be replaced with an angled rigid ramp member if desired which would still allow the fasteners 47 to slide down and over the fasteners 48 and then interlockingly engage, however the present arrangement is more secure and also provides a positive "snapping" sound that indicates to an assembler that full engagement has been made. A strip of elastic material 49 is attached along a lower edge of the front panel 50 of upholstery material, and a stiff extruded strip 51 is attached to the lower edge of the front panel 50. The stiff extruded strip 51 is shaped to fit into a channel 52 (FIG. 12) along a bottom of the back support 36 and to frictionally engage the channel 52 for retaining the cushion subassembly 37 downwardly against the back support 36.

The cushion assembly 37 (FIGS. 4 and 8) is stressed and unevenly compressed during assembly of the upholstery sock 42 onto the cushion 41 and cushion (stiffener) support 40, especially at visible corners where the upholstery material (which is made from flat sheets of material but sewn into a 3-dimensional shape) covers and to some extent compresses the cushion 41. It is noted that the upholstery material needs to have some tension in order to eliminate loose areas, which loose areas result in sagging fabric which has a poor appearance and which is interpreted to be poor quality by consumers. As described below, the cushion assembly 37 is thermally stress-relieved after assembly to relax the polymeric fibers and the upholstery sock to a state of "minimized balanced tension", where even after being thermal stress-relieved, the cushion still exerts some compressive forces against the upholstery material, and where the upholstery material still has some tensile forces pulling against the cushion.

Figure 5:
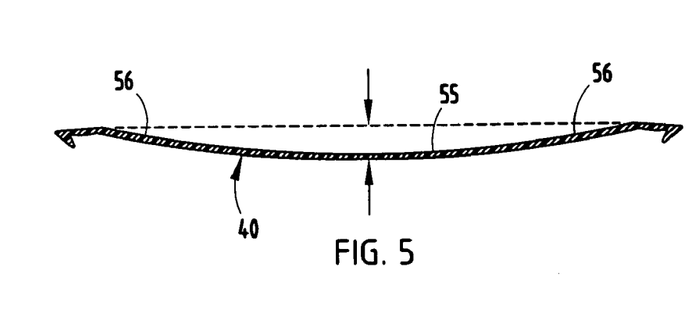
FIGS. 5-6 are cross sections taken along lines V-V and VI-VI in FIG. 4.
Figure 6:
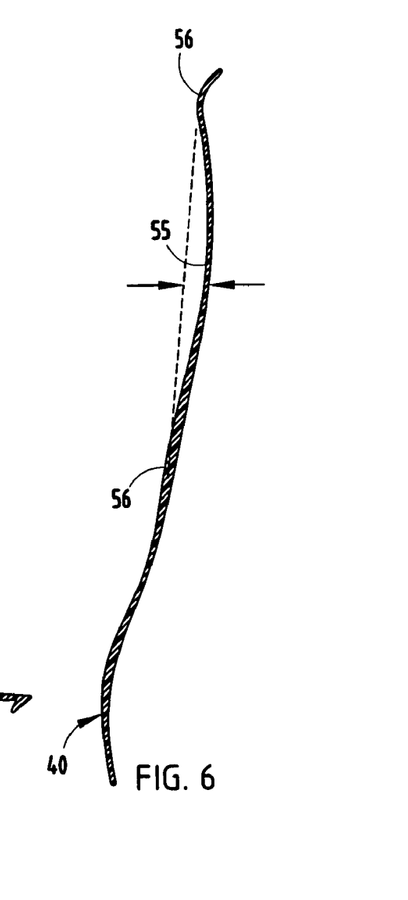
Figure 7:
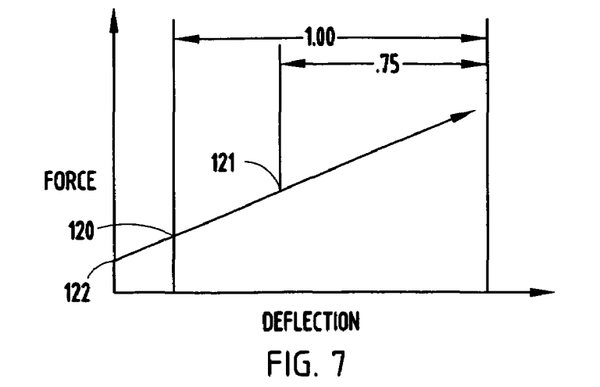
FIG. 7 is a chart showing the force-deflection curve for the structure of FIG. 4.

The illustrated cushion (stiffener) support 40 (FIGS. 4-6) includes a shallow depression 55 in the upper back region (i.e., thoracic region) of the cushion support 40 surrounded by marginal material 56 on its front surface or face that matches a shape of the back support 36, so that when attached, the two components form a laminar arrangement. The cushion 41 fills the depression on the cushion support 40 and forms a front surface that is (at least along one axis) basically flat or slightly forwardly convex. It is important to understand that the non-woven PETE (or PET) cushion material has thermoplastic fibers within it that are able to re-bond when hit with steam or thermal energy, such that the PETE cushion material can be reformed to any shape. However, even when reformed, the PETE cushion material maintains its original force/deflection compression curve, with the exception that the original initial compression set point 120 is reset to have a new initial compression set point 121 (as shown in FIG. 7). Thus, when the raw blank of PETE cushion material (which has an initial compression set point 122) (of a uniform thickness) is reformed to have different thicknesses in order to fill the depression 55, the cushion 41 maintains its force/deflection curve (minus portions of a front end of the curve). In other words, when thicker areas of the cushion material are initially compressed, they have an initial resistance to compression. However, once compressed to a same thickness as other "reformed" areas of the cushion, they have the same or similar resistance to compression. Further, their force/deflection curve is relatively linear. For this reason, the present cushion 41 is particularly comfortable, since the shape of the front surface of the cushion support is the shape that the seated user feels as the seated user approaches a full compression of the cushion. The support given to a seated user is very close to the shape designed into the front surface of the cushion support 40, even with the addition of the cushion 41.

When the upholstery sock with front panel 50 is initially pulled over and then onto the support 40 and cushion 41, the upholstery front panel 50 is tensioned, but its tension is non-uniform in some areas and the cushion 41 is non-uniformly compressed. By applying (i.e. "hitting") the cushion 41 and upholstery sock 42 with steam or hot air (see FIG. 8), the fibers within the cushion release and rebond so that the cushion 41 resets to a new shape. The temperature and application time of the steam can be varied for best results, but it is contemplated that the temperature and time will be relatively low and short, since the steam will pass through the assembly. The new shape of the cushion is not simply the shape of the cavity between the front upholstery panel 50 and the front surface of the cushion (stiffener) support 40. Instead, it is contemplated that the cushion will be slightly compressed, such that a state of "minimized balanced tension" is created between the cushion and upholstery, as described below.

Specifically, after the step of applying steam to relieve tension in the upholstery sock 42 and to reform the cushion 41, especially after the sock 42 and cushion 41 begin to cool, there is a state of "minimized balanced tension" (i.e., stress relieved, but still having some tension) that develops between the upholstery sock 42 and the cushion 41. Even after being thermal stress-relieved, the (cooled) cushion 41 still exerts some compressive forces against the material of the upholstery sock 42, and the upholstery material still has some tensile forces pulling against the cushion 41. This results in an optimal condition especially at the upper outer corners of the present back construction and on the front of the present back construction that leads to a more consistent appearance. The optimal condition includes the fact that the upholstery sock 42 is adequately and more uniformly tensioned in all directions to reduce undesired, uneven wrinkles and to eliminate undesired loose sections of material. Also, the optimal condition includes the fact that the upholstery sock 42 is drawn uniformly snug in the upper outer corners, without over-tightening in the corners and without undesired undulations in any seams that extend along the corners around a perimeter of the back construction. Also, the optimal condition includes the fact that the cushion 41 has different thicknesses, but good support is provided to a seated user as the user initially begins to sit in the chair (i.e., as the user initially engages the upholstery sock and receives support by initially compressing the cushion). Further, the optimal condition includes the fact that the support provided by the cushion is widespread and uniform. It is noted that the non-woven fibrous PETE cushion 41 provides an almost linear compression resistance which, as the user finally sits in the chair (i.e., as the user fully engages the upholstery sock and receives full support from the cushion), the uniformity of support is based on the remaining compressibility of the cushion and is consistent through the entire front surface. Further, the optimal condition includes the fact that the cushion 41 provides a desired rate of resistance to compression at specific thicknesses, regardless of the pre-formed shape, such that the user feels the same amount of pressure when the cushion has a specific amount of compression remaining. This allows the chair designer to accurately control the distribution of support across the front surface of the chair, and allows the designer to control the support received in specific regions on the front surface in a way not previously possible. Another desirable attribute is that in the present back construction, all major components can be separated and recycled, such that they are environmentally friendly and also can be more easily refurbished or repaired.

Figure 8:
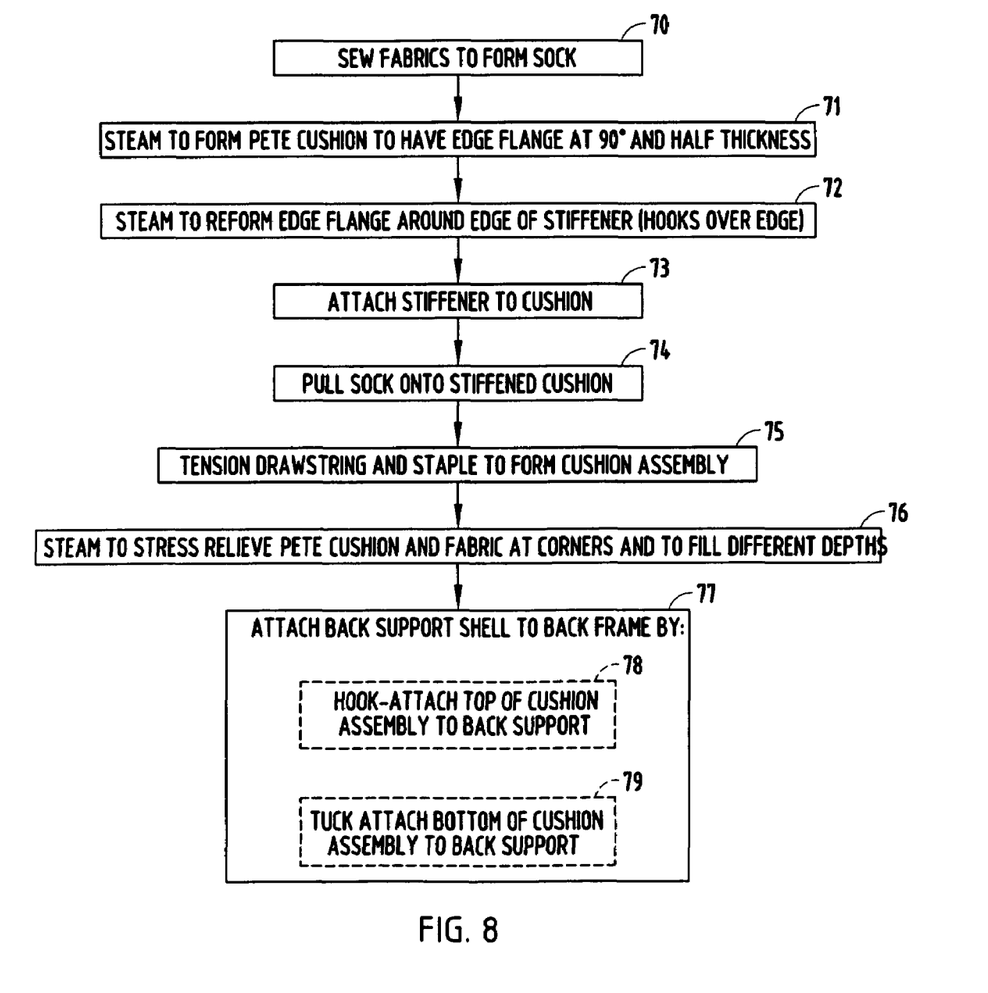
FIG. 8 is a chart showing a method of assembly for the chair back of FIG. 2.
Figure 9:
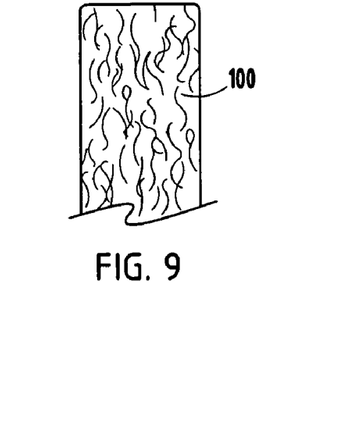
FIGS. 9-11 are cross sections showing a changing shape of an edge of the non-woven fibrous cushion of during the process of FIG. 8.
Figure 10:
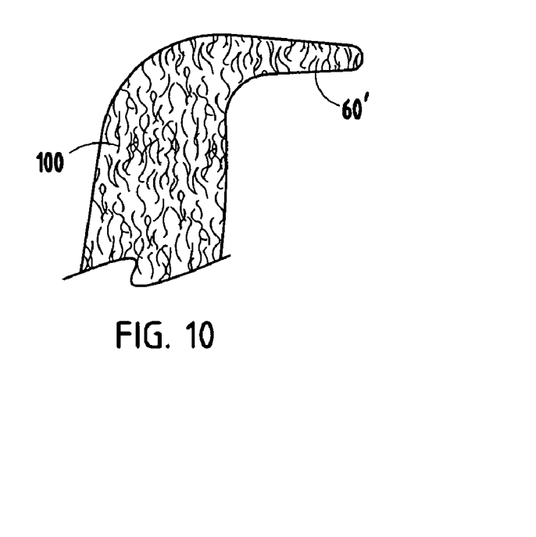
Figure 11:
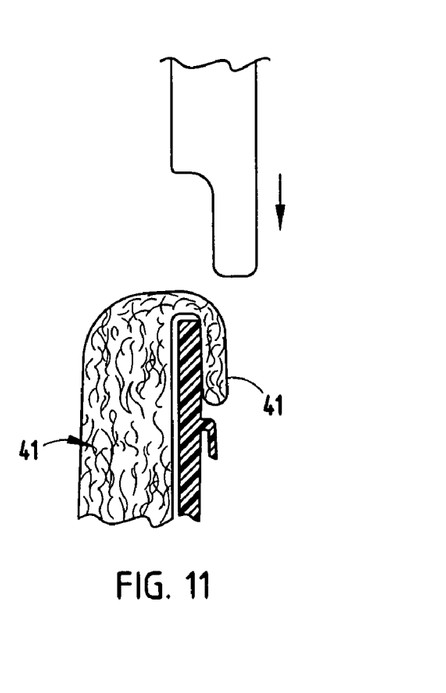

FIG. 8 is a flow chart showing a method of assembly for the present back construction. The method includes sewing sections of fabric to form a sock (step 70). The method further includes cutting a blank (100) from a uniformly thick sheet of PETE non-woven fibrous cushion material and forming the PETE blank to have partially formed edge flanges (60') (step 71). In the illustrated step 71, the partially formed edge flanges 60' extend at 90 degrees (see FIG. 10) and have a thickness about half or less that of the original blank. Steam is then applied (step 72) (FIG. 8) to further form the edges (60) around onto the back side surface of edges of the cushion (stiffener) support, so that the edges (60) of the cushion "hook" over the edges of the cushion (stiffener) support 40. The cushion (stiffener) support 40 is then attached to the cushion (41) by positioning the cushion edge (60) on the edge of the cushion stiffener, either as (an automated) part of step 72 or as a separate step 73 subsequent to the step 72. The upholstery sock is then pulled onto the assembly of the cushion (41) and cushion (stiffener) support (40) in a step 74, and a draw string (61) is tensioned and stapled to the cushion (stiffener) support in a step 75 to form a cushion assembly (37). Steam or hot air is applied to the cushion assembly (37) in step 76 at upper outer corners of the cushion assembly (37) and/or along a front of the upholstery subassembly to reform the cushion (41) to take up a cavity formed between the front panel (50) of the upholstery sock (42) and a front surface of the cushion support (40). The cushion assembly (37) is attached to the back support (36) in step 77 (which can be performed prior to step 76 if desired). The attachment in step 77 includes hook-attaching fasteners (45) (step 78) at a top of the cushion subassembly (i.e., in the lumbar region of the cushion stiffener support) onto mating fasteners (46) at a top of the back support, and pulling downward until second fasteners (48) lower on the cushion support 40 engage mating lower fasteners (47) on the back support (36) to prevent reverse movement and disengagement of the first fasteners. A bottom strip (49) of elastic material on the front panel of the upholstery sock is stretched and an extruded strip is tucked into a channel at a bottom edge of the back support in step 79, thus holding the cushion assembly (37) onto the back support (36). If desired, the ends of the extruded strip (49) can be stapled or otherwise secured in the channel for permanence in a step 80.

Back Retention Clip

The back shell 36 in its thoracic region (FIGS. 2 and 12) is equipped with multiple hooks (i.e., fasteners 45) pointing in one direction and one or more shoulders (i.e., a "back" surface of fasteners 45) oriented in such a way as to oppose the disengagement of the hooks (45) once the back shell 36 is assembled to a fully-install position. Specifically, the inner shell (cushion support 40) is equipped with holes or slots or straps that engage the hooks (45) again in one direction. The inner shell (back support 40) then also has one or more tabs (i.e., fasteners 48) protruding from the surface between the two shells that slides over and latches against the shoulder of fasteners 47 on back support 36. This shoulder and clip act interlock against the hooks and slots to prevent the back shell from becoming unintentionally disengaged. However, if an assembler wants to disengage the shells (i.e., cushion support 40 from back support 36), the assembler raises the clips above the associated shoulders and slides the slots off of the opposing hooks. This has an advantage over screws since this arrangement cannot be stripped and is not visible. It also has an assembly advantage in that it engages in the same direction as one moves the shell (cushion support 40) to engage the hooks. An additional benefit is that the clips (fasteners 48) make an audible "click" as they snap over the shoulder on fasteners 47. Notably, the relative location of the fasteners 47 to clips 45 can be increased or decreased to affect the retention force of the fasteners, thus changing the force necessary to engage and/or disengage them.

The edge pre-form takes the forming process (FIGS. 13-19) for pre-forming PETE material (non-woven fibrous cushion material) to a higher level of technology and in a way that reduces manufacturing/assembly steps. In the present illustrated process, we pre-form the PETE fiber to the shape of the cushion (FIGS. 13-15) but leave perpendicular flanges 60' (FIGS. 10 and 15) extending away from the comfort surface. These flanges 61' are then folded over the inner shell to form hook-shaped edge flange 60 (FIGS. 11 and 18) (back support 36) in the next operation (FIGS. 16-19). This leaves a smooth finished edge for upholstery material to wrap over.

Illustrated Process

In station just prior to step 71 (see FIG. 13), a raw fiber blank 100 is placed and located in initial forming station on top of what we will call the post 101 (i.e., the bottom die). Steam comes from lower half of tool to pre-soften the PETE fiber (see FIG. 14), with the steam causing the PETE fiber to soften and reset (i.e. causing some fibers to un-bond and re-bond and also reform) during the following process. As the upper tool 102 begins to lower, the center 103 of the upper tool contacts the blank first and forms the comfort surface of the blank (i.e., that part of the cushion 41 that is on the front surface of the back construction and that supports a seated user). The center 103 also holds the blank 100 as the outer ring 104 of the upper tool continues to lower, thus wiping and brushing the remaining PETE fiber over the edge of the lower tool and forming the edge or flange around the part (see FIG. 15). Tool 101/102 fully closed with face in contact with PETE fiber and outer ring at bottom of travel with a skirt fully formed around the blank 100. The tool then holds in this condition (FIG. 15) and the vacuum turns on cooling and setting the PETE fiber in its new condition. After a short dwell time, the upper tool 102 raises and the lower tool 101 comes back out to the operator. The vacuum is shut off so that the part can be removed manually (or robotically) from the post. The blank now has a recess formed on its rear side, bounded by the perimeter (formed) flanges or "skirt". This process is not totally dissimilar to draw forming of sheet metal. It is contemplated that, in some applications, the cushion is now sufficiently formed for use without further forming the blank.

In steps 72/73 (FIG. 16), the finished partially-formed blank 100 from station 1 is placed face down into the lower tool half 101 and the inner plastic shell 40 is loaded into the recess (i.e. inside the formed flanges). The upper tool 109 travels down and traps the inner shell against the PETE cushion against the lower tool 110. Steam is released from an annular orifice in the upper tool 109 forcing it to impinge on the PETE flange, re-softening it and making it pliable and formable. Side slides 105 (FIG. 17) positioned around the cavity then travel inward in direction 106 folding and holding the flange down against the back side of the shell. Once folded over, vacuum helps to cool and set the material in its new orientation. The upper tool 109 then raises (FIGS. 18-19) and the lower tool 110 comes back out to the operator where the side slides retract and the vacuum shuts off. Notably, in the illustrated process, the cushion is not adhered to the cushion support, but instead is mechanically (loosely) held onto the cushion support by the folded edges 60. This allows separation of components, such as for recycling of the components and/or for refurbishing and/or for repairing the chair. It is noted that the retention strength of retaining the cushion onto the support can be adjusted by a shape and thickness of the formed flanges.

Steam Stress Relieve

The steam stress relieving process is not totally dissimilar to the thermal activation process used in many products with a significant exception. No adhesive layers are used in the illustrated process. In traditional processes for forming foam and attaching upholstery to the foam, thermal activated adhesive is on the top of the cushion and the top of the topper pad. When the assembly is placed into the tool and steam is applied, the adhesive activates and wets out, resulting in the fabric being bonded to the topper foam and the topper foam being bonded to the core foam. During the present inventive process, the steam also allows the fabric to "stress relieve" meaning that the fabric relaxes in high stress areas and constricts in low stress areas. The result is a cushion assembly 37 with nicer form and fewer undesired wrinkles.

It is contemplated that the present article and processes can be used for forming more than just backs of chairs. In particular, it is contemplated that the present process can be used to form other chair parts such as armrests and seats, and further can be used to form non-chair parts such as covers and panel skins for partition panels and/or for automobile components (such as consoles and inner door panels), and the like.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A method for stress-relieving upholstery comprising steps of:
    providing a furniture unit including a support having corners;
    providing a cushion of formable polymeric fibers and having formed edges;
    positioning the cushion on a front of the support with the formed edges extending rearward of the corners of the support;
    providing an upholstery cover shaped to cover the support and the cushion including the corners;
    positioning the upholstery cover on the support and the cushion to cover the support and the cushion and to form an assembly; and
    stress-relieving at least the corners of the assembly including the cushion and the upholstery cover to reduce distortions and objectionable wrinkles in the upholstery cover at the corners by applying hot gases to cause the polymeric fibers and also the upholstery cover to relax to a state of minimized balanced tension.

2. A method of constructing a seating unit comprising steps of:
    providing a support panel with a concave front surface;
    providing a cushion of non-woven polymeric fibers engaging the front surface, the cushion being formed to have a shape with a rear surface matching the concave front surface and a cushion front surface defining a concave recess;
    assembling an upholstery sheet onto the support panel and the cushion, the upholstery sheet being tensioned across the concave recess to define a cavity; and
    thermally treating the assembly of the support panel, the cushion and the upholstery sheet to cause at least some of the polymeric fibers of the cushion to take on a relaxed state that both fills the cavity at the concave recess and that also stress-relieves the cushion and the upholstery sheet at upper corners of the assembly to cause a state of minimized tension.

3. A method of upholstering a support member with edges, comprising steps of:
    providing a cushion of formable polymeric fibers made from a flat blank but thermally reformed to have at least one formed edge;
    mechanically attaching the at least one formed edge of the cushion onto an edge of the support member;
    stress relieving and reforming the cushion by thermally treating at least the at least one formed edge with hot gases to rebond some of the polymeric fibers of the formed edge of the cushion while in the attached condition; and
    placing an upholstery cover over the cushion, wherein the upholstery cover has a sock shape, and wherein the step of placing an upholstery cover over the cushion includes pulling the upholstery cover onto the cushion and support member prior to the step of stress-relieving.

4. The method defined in claim 3, wherein the blank has a uniform thickness, and the step of providing a cushion with thermally reformed blank includes forming the blank to have a non-uniform thickness, including forming the at least one formed edge.

5. The method defined in claim 4, wherein the step of forming the blank includes forming a perimeter of the blank to have multiple formed edges.

6. The method defined in claim 5, wherein the step of attaching the at least one edge of the cushion includes forming the at least one formed edge to a shape that engages front and rear surfaces of the edge of the support member without requiring deforming or wrapping of the formed edge onto the edge of the support member.

* * * * *